(12) United States Patent
Tran

(10) Patent No.: US 7,163,041 B1
(45) Date of Patent: Jan. 16, 2007

(54) TIRE INSTALLATION AND REMOVAL TOOL

(76) Inventor: Loi Van Tran, 1028 Jackson St., Easton, PA (US) 18042

( * ) Notice: Subject to any disclaimer, the term of this patent is extended or adjusted under 35 U.S.C. 154(b) by 10 days.

(21) Appl. No.: 11/247,856

(22) Filed: Oct. 11, 2005

(51) Int. Cl.
B60C 25/04 (2006.01)

(52) U.S. Cl. .................... 157/1.3; 157/1.1; 157/1.17

(58) Field of Classification Search ............ 157/1.1, 157/1.3, 1.17
See application file for complete search history.

(56) References Cited

U.S. PATENT DOCUMENTS

| | | |
|---|---|---|
| 834,908 A | 11/1906 | Hussey |
| 934,461 A | 9/1909 | Phillips |
| 951,200 A | 3/1910 | Pilliner |
| 1,100,032 A | 6/1914 | Speck |
| 1,271,919 A | 7/1918 | Mathias |
| 1,567,025 A | 12/1925 | Allison |
| 1,741,801 A | 12/1929 | White |
| 1,829,804 A | 11/1931 | Loomis et al. |
| 2,112,661 A | 3/1938 | Abrahams |
| 2,188,211 A | 1/1940 | Tilson |
| 2,226,757 A | 12/1940 | Ewell |
| 2,294,271 A | 8/1942 | Bethard |
| 2,311,789 A | 2/1943 | Taylor |
| 2,399,146 A | 4/1946 | Schumann |
| 2,565,216 A | 8/1951 | Gox |
| 2,634,803 A | 4/1953 | Obee |
| 2,712,350 A | 7/1955 | Henderson |
| 3,873,067 A | 3/1975 | Carpio et al. |
| 3,908,728 A * | 9/1975 | DeMola ............... 157/1.22 |
| 4,090,548 A | 5/1978 | Wolf |
| 4,133,363 A | 1/1979 | Gardner |
| 4,360,052 A | 11/1982 | Norris |
| 4,403,640 A | 9/1983 | Schifferly |
| 4,436,134 A | 3/1984 | Gaither |
| 4,461,335 A | 7/1984 | Beemer |
| 4,527,607 A * | 7/1985 | Gaither ............... 157/1.3 |

(Continued)

*Primary Examiner*—Joseph J. Hail, III
*Assistant Examiner*—Shantese L. McDonald
(74) *Attorney, Agent, or Firm*—Duane Morris LLP

(57) ABSTRACT

A tool is provided for assistance in removing and installing tires on wheel rims. The tool can be provided with a handle having a tool head disposed at each end. Each tool head is designed to fit between a tire bead and an associated wheel rim so that when the handle is levered, a force is applied to the bead and rim that moves the bead over the rim. Each tool head has a substantially flat portion which can be easily fit between opposing tire and wheel rim surfaces. One tool head has a slightly hooked distal tip to enable axial engagement with a flange of the wheel rim, and thus can be used either for installing a tire on a rim or for removing a tire from the rim. Another tool head has a protrusion disposed near the tool midpoint to engage a flange of the wheel rim. The protrusion can be a roller member having a pin axis perpendicular to an axis of the tool handle. This roller can be fabricated from a soft polymer or rubber material so that the tool will not damage soft-metal wheel rims such as aluminum. The handle can have a pronounced curvature that allows a portion of the handle body to be received within the cavity formed by the wheel rim. This curvature allows for a greater range of motion of the handle, thus providing the user improved leverage as compared to prior tools. The tool heads may be permanently attached to the handle, or they may be removable to allow the user to customize the tool to the desired application.

16 Claims, 17 Drawing Sheets

U.S. PATENT DOCUMENTS

| | | |
|---|---|---|
| 4,738,294 A | 4/1988 | Fosse |
| 4,756,354 A | 7/1988 | Callas |
| 4,846,239 A | 7/1989 | Heller et al. |
| 4,890,661 A | 1/1990 | Goebel |
| 4,919,184 A | 4/1990 | duQuesne |
| 4,995,439 A | 2/1991 | Burge |
| 5,009,257 A | 4/1991 | Reeves |
| 5,123,470 A | 6/1992 | Tran |
| 5,143,134 A * | 9/1992 | Tran ........................... 157/1.3 |
| 5,152,330 A | 10/1992 | Heise |
| 5,191,934 A | 3/1993 | Wicklund |
| 5,244,029 A | 9/1993 | Schoen et al. |
| 5,265,661 A | 11/1993 | Tran |
| 5,343,921 A | 9/1994 | Kusner |
| 5,363,897 A | 11/1994 | Branch |
| 5,472,034 A | 12/1995 | Corghi |
| 5,495,882 A | 3/1996 | Trant |
| 5,678,621 A | 10/1997 | Trant |
| 5,740,848 A | 4/1998 | Goracy |
| 5,806,578 A | 9/1998 | Gonzaga |
| 5,971,052 A | 10/1999 | Kliskey |
| 5,979,532 A | 11/1999 | Wridt |
| 6,269,861 B1 | 8/2001 | Tran |
| 6,588,479 B1 * | 7/2003 | Kliskey ...................... 157/1.3 |
| 6,712,114 B1 | 3/2004 | Kliskey |

* cited by examiner

TIRE INSTALLATION AND REMOVAL TOOL

FIELD OF THE INVENTION

The invention relates to tools for assisting in the installation and removal of vehicle tires to/from wheel rims. In particular, the invention concerns a manually manipulated tool that is structured to engage the wheel rim flange and to manipulate the tire axially inwardly (relative to the wheel axis) from a position of engagement with the wheel rim flange. By assisting in separating the tire bead from the rim flange, the tool permits easy displacement of the tire relative to the rim in axial and radial directions, and thereby facilitates tire removal or installation.

BACKGROUND OF THE INVENTION

Various manual and powered tools for installing and removing tires from wheel rims are known. In a manual version such tools generally comprise an elongated pry bar handle, which is gripped by a user, and a flattened tool end for insertion between the tire bead and the wheel rim. The bead of a tire is generally wire reinforced and resists deformation. The bead is usually intended to seal a mounted tire to the wheel rim. For this purpose the bead has a diameter that is somewhat less than the diameter of the wheel rim flange and resides between the spaced flanges of the wheel rim. The bead resists stretching and is urged axially against the rim and sealed to the rim, inter alia, by pneumatic pressure in the tire or in an inner tube in the tire.

To remove a tire from a rim, the beads are unsealed or "broken" by moving them axially inwardly to disengage from sealing engagement with the rim. Then the two beads and sidewalls of the tire are passed axially over one of the rim flanges to remove the tire from the rim. Inasmuch as the diameter of the bead is less than that of the rim, this involves forcing the bead over the rim, by stretching the bead and/or deforming the bead into an oval and moving the longer dimension of the oval around the rim.

A working end of a tool is typically inserted between the tire bead and the rim flange. The user then applies pressure to the opposite handle end, using the tool as a lever and the wheel rim as a fulcrum. A short length of the tire bead is thereby lifted axially over the rim flange. This process is repeated in successive stages to increase the length of the bead on the axial outside of the rim flange, often using two or three pry tools around the periphery of the wheel rim to hold a portion of the bead against popping back over the rim flange while more of the bead is pried over the rim flange. After a certain angular span of the bead has been passed over the rim flange, prying at a distance from that span (e.g., at a diametrically opposite position) pulls the bead portion that is already outside the rim radially inwardly on the outside, rather than tending to pull that portion back between the rim flanges. It thus becomes easier to pass the remainder of the bead axially over the rim until the entire tire bead resides outside the rim.

Powered machines are available to serve the same function. Using such devices, the wheel is typically mounted on a spindle and the bead is broken. A short length of the tire bead is then pried over the rim flange, and a tool is placed under the lifted bead and engaged with a driving shaft on the spindle. An end of the tool is then passed circumferentially around the periphery of the wheel rim flange, pulling the entire bead over the rim flange.

With each of the above techniques, in order to fully remove the tire from the rim, the opposite side bead must be passed over the same rim flange as the first bead, in a similar manner. For installing a tire on a wheel rim, the foregoing process is carried out in reverse order, manually or using powered means.

Recently, truck tire manufacturers have introduced tires that are sized to take the place the traditional "dual tire" pairs used for trailer applications. These new tires are significantly wider than either of the single width tires they replace. As such, they can also have significantly deeper wheel rims, which can complicate the removal process when using current tools as described above.

Often, truck tires must be replaced on the roadside, such as when a truck driver experiences a flat on the highway. In such cases, the driver usually calls ahead for roadside assistance, rather than attempt to change the tire himself. Thus, a desirable tool for performing the above functions should be compact for easy storage and transportation. Additionally, since it can be expected that flats will occur in the winter, the tool should reduce or eliminate the need for the user to stand on the tire or wheel rim to remove and install a tire on a rim. This would reduce the chance that the user could slip and injure himself when applying the forces to the handle necessary to operate the tool.

Furthermore, it may be an advantage to allow a damaged tire to be removed and a new tire installed on a wheel rim without removing the wheel rim from the vehicle. This can be of particular advantage for utility vehicles, such as backhoes, etc, where the wheels are particularly large and may be difficult to remove from the associated vehicle axle. It is also advantageous because it can speed the overall tire replacement process.

Thus, there is a need for an easy to use tool that is effective for installing and removing any of a wide variety of sizes of tires from their associated wheel rims, including newer truck tires having significantly wider wheel rims, and which can be used by the operator in a safe manner, even in inclement weather.

SUMMARY OF THE INVENTION

A tire tool is disclosed comprising a tool head and a handle, said tool head having a tire engaging surface and a wheel rim engaging surface, said tool head being connected to a first end of said handle. The handle may have a substantially U-shaped portion positioned adjacent said tool head. The substantially U-shaped portion may be sized and configured to be received within a space formed between first and second diametrically opposed surfaces of a wheel rim when said wheel rim engaging surface is engaged with said wheel rim.

A tire tool is further disclosed comprising a handle member connecting between first and second working ends. Each working end may have a tire engaging surface and a wheel rim engaging surface, said handle member generally defining a longitudinal axis between said first and second working ends. A first leg may project laterally relative to the longitudinal axis and comprises first and second leg segments, said first leg segment being connected to said first working end of said tire tool, said second leg segment being spaced a first lateral distance from the longitudinal axis. A second leg may project laterally relative to the longitudinal axis and comprises third and fourth segments, said third segment connected to said second segment of said first laterally projecting leg and said fourth segment connected to said second working end of said tire tool, said third segment being spaced a second lateral distance from said longitudinal axis. Thus, when the tire engaging surface and the wheel rim engaging surface of said first working end are engaged with a wheel rim and tire, respectively, said handle member is movable in a first direction to move said tire with respect to said wheel rim; and said second and third segments are receivable within a cavity formed by an upper flange portion of said wheel rim.

A method of moving a tire with respect to a wheel rim is also disclosed, comprising: providing a tire tool having a tool head and a handle, said tool head having a tire engaging surface and a wheel rim engaging surface, said tool head being connected to a first end of said handle, said handle having a substantially U-shaped portion positioned adjacent said tool head; positioning said tool head between a flange of a wheel rim and a bead of a tire so that said tire engaging surface contacts said bead and said wheel rim engaging surface contacts said flange of said wheel rim; and moving said handle in a first direction to impart a force to said bead to move said bead with respect to said flange of said wheel rim; wherein said moving step comprises receiving said substantially U-shaped portion of said handle within a space defined by first and second diametrically opposed surfaces of said flange of said wheel rim.

BRIEF DESCRIPTION OF THE DRAWINGS

Other objects, advantages and novel features of the invention will become more apparent from the following detailed description of the invention when considered in conjunction with the accompanying drawings, wherein.

DETAILED DESCRIPTION

Figure 1:
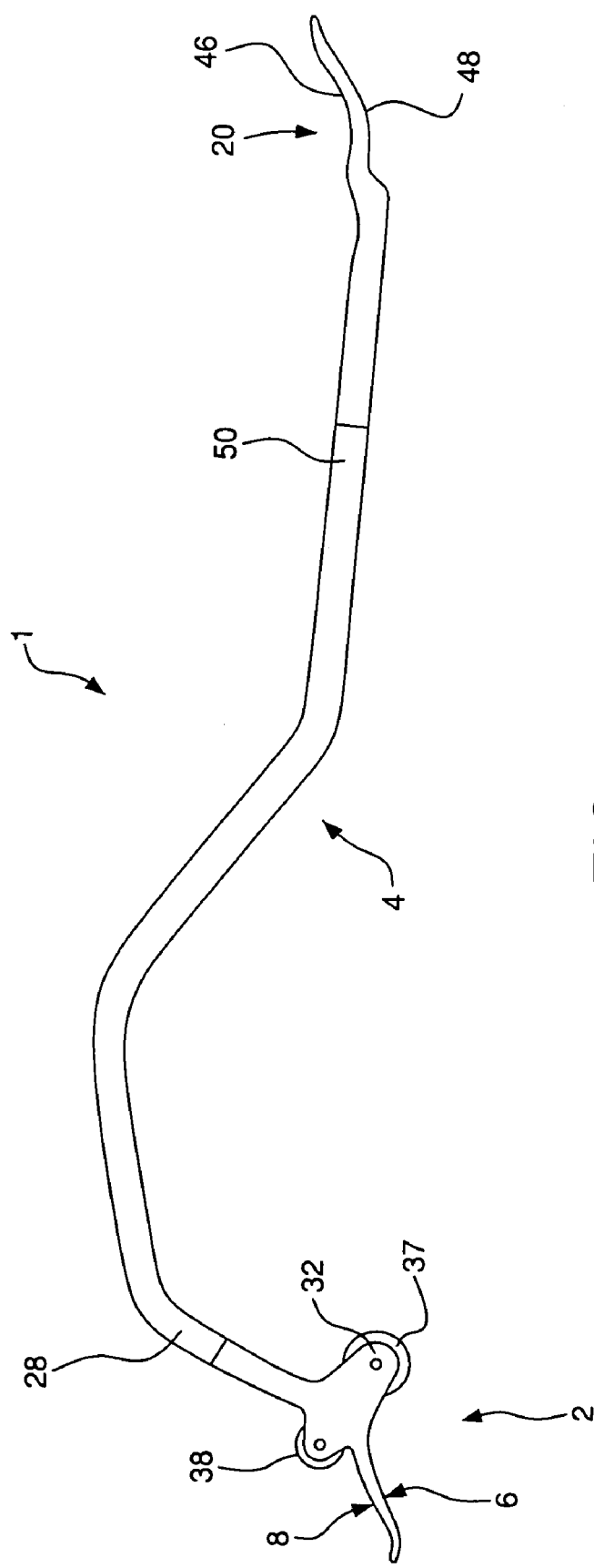
FIG. 1 is a side view of a tool according to the invention for removing and installing a tire.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
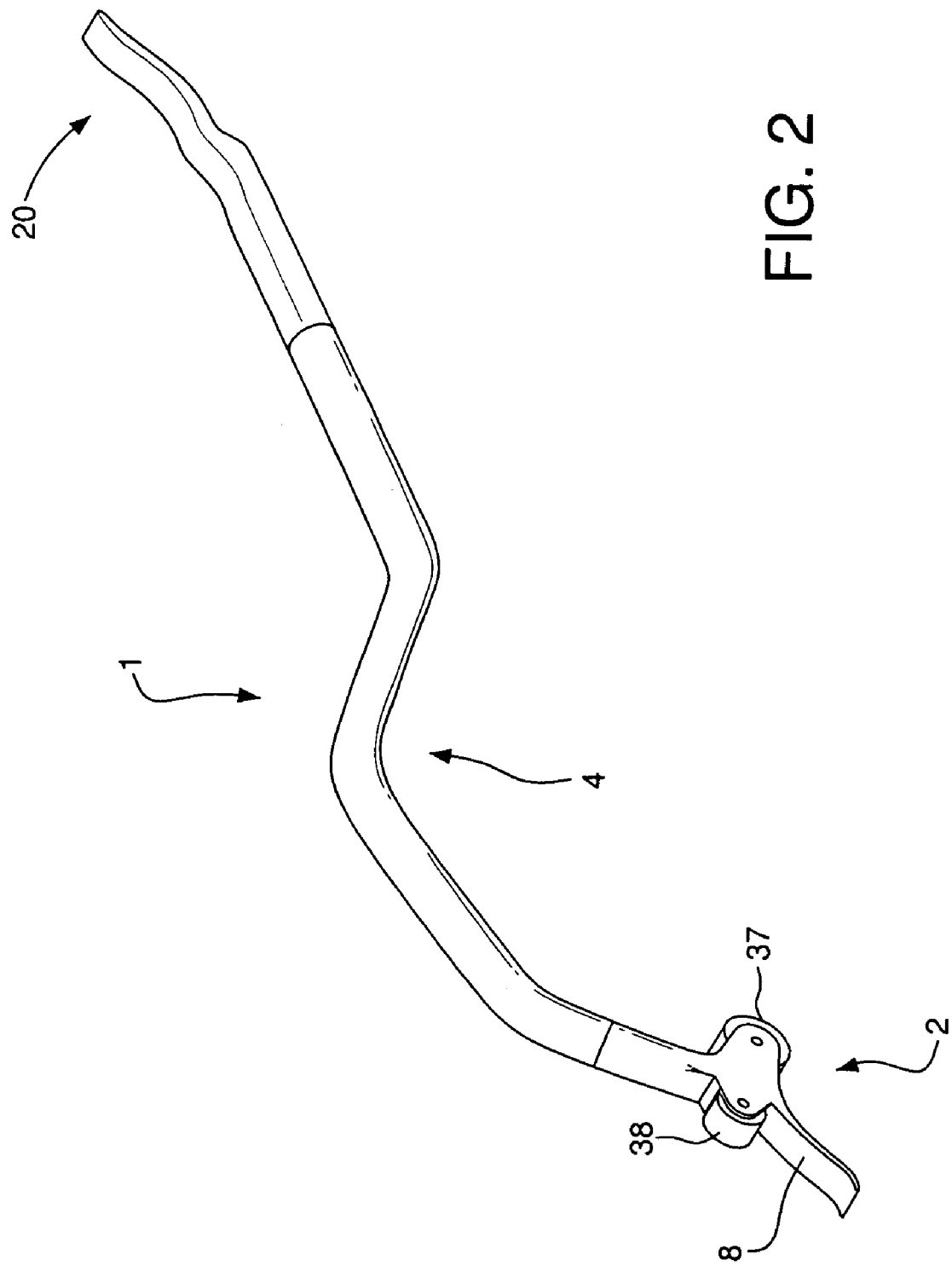
FIG. 2 is an isometric view of the tool of FIG. 1.
Figure 8:
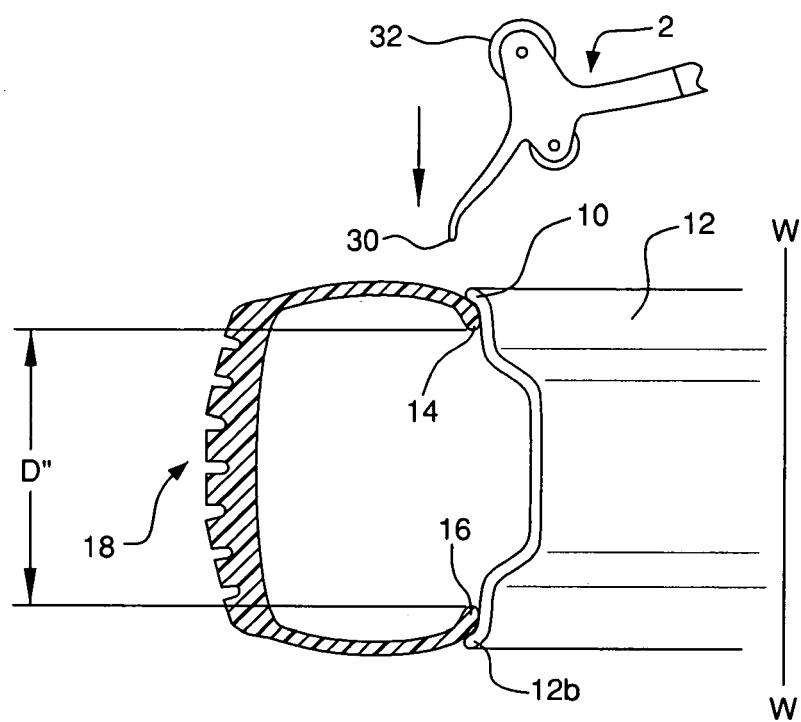
FIG. 8 is a cross-sectional view through a section of a tire and wheel rim, showing the tool of FIG. 1 with the tool head of FIGS. 3a, b in an installation position with respect to the tire and associated wheel rim.

A hand tool is disclosed for manipulating a vehicle tire relative to a wheel rim. Specifically, an improved tool is disclosed for allowing a user to quickly and efficiently change a vehicle tire. Referring to FIGS. 1 and 2, tool 1 may comprise at a first tool head 2 and a handle 4. The first tool head 2 may have a tire engaging surface 6 and a wheel rim engaging surface 8. The tire and wheel rim engaging surfaces 6, 8 may be configured so that the tool head 2 can be driven between a rim flange 10 (FIG. 8) of a wheel rim 12 and respective a top or bottom bead 14, 16 of a tire 18 so that the tire may be installed on, or removed from, the wheel rim 12 simply by levering the handle portion 4 in a first or second direction. Roller elements 37, 38 may be provided on the tool head 2 to minimize friction between the tool and the portions of the tire or rim that it engages, and also to minimize the chance that the user could damage the tire or wheel rim. The tool 1 may have a second tool head 20 connected to the handle portion 4 at an end opposite to that of the first tool head 2 to provide a multi-purpose feature. As with the first tool head 2, the second tool head 20 (FIGS. 4a, b) may have tire and wheel rim engaging surfaces 46, 48 for installing/removing a tire from a wheel rim. Providing such a "double-ended" tool may make the tool 1 more versatile, since the first and second tool heads 2, 20 may have different sizes, shapes and geometries and thus may be used to perform different functions in installing or removing a tire, or may be used with tires/wheels of different sizes. As a further advantage, the handle 4 itself may be angled with respect to the first and second tool heads 2, 20 to minimize interference with the wheel rim 12 during levering movement. This is of great advantage because it allows for maximum handle travel when moving a tire with respect to the wheel rim using the tool.

Figure 3A:
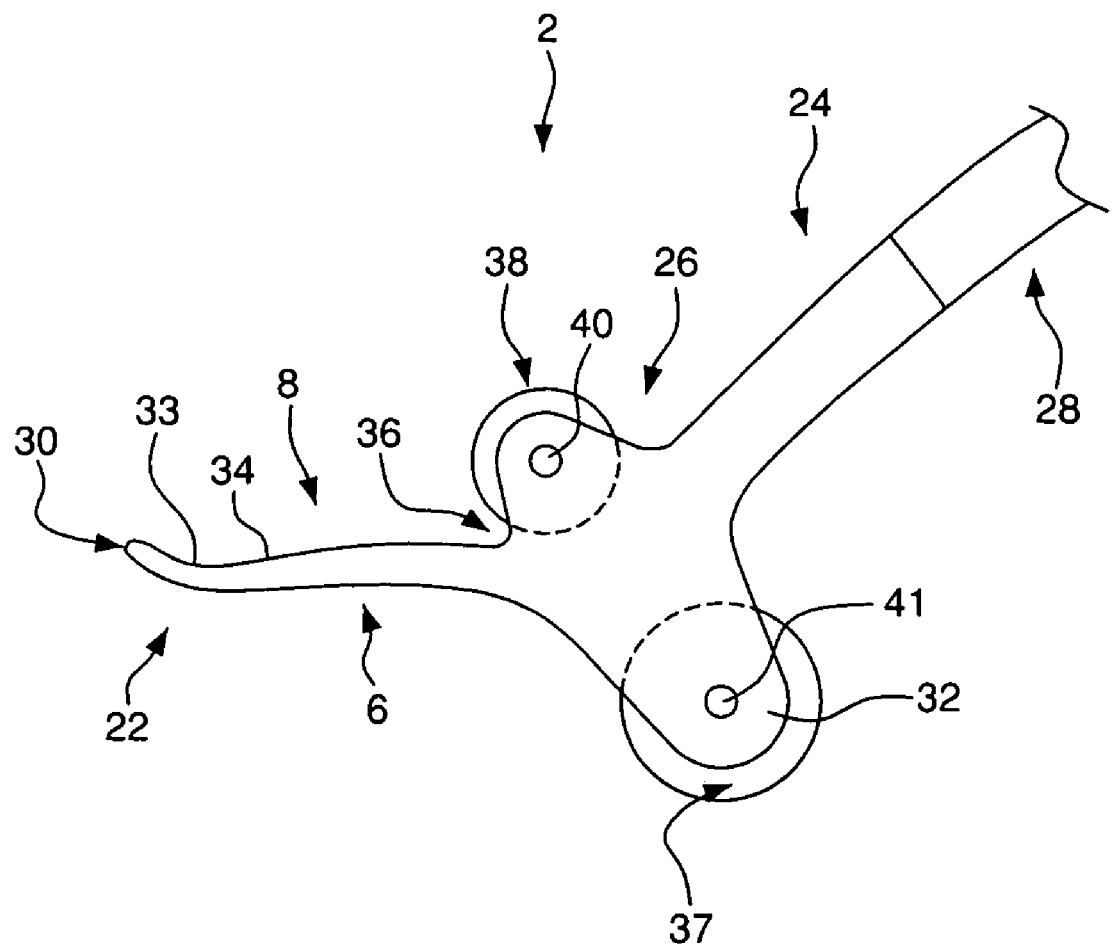
FIGS. 3a and 3b are side and isometric views of a first tool head of the tool of FIG. 1.
Figure 3B:
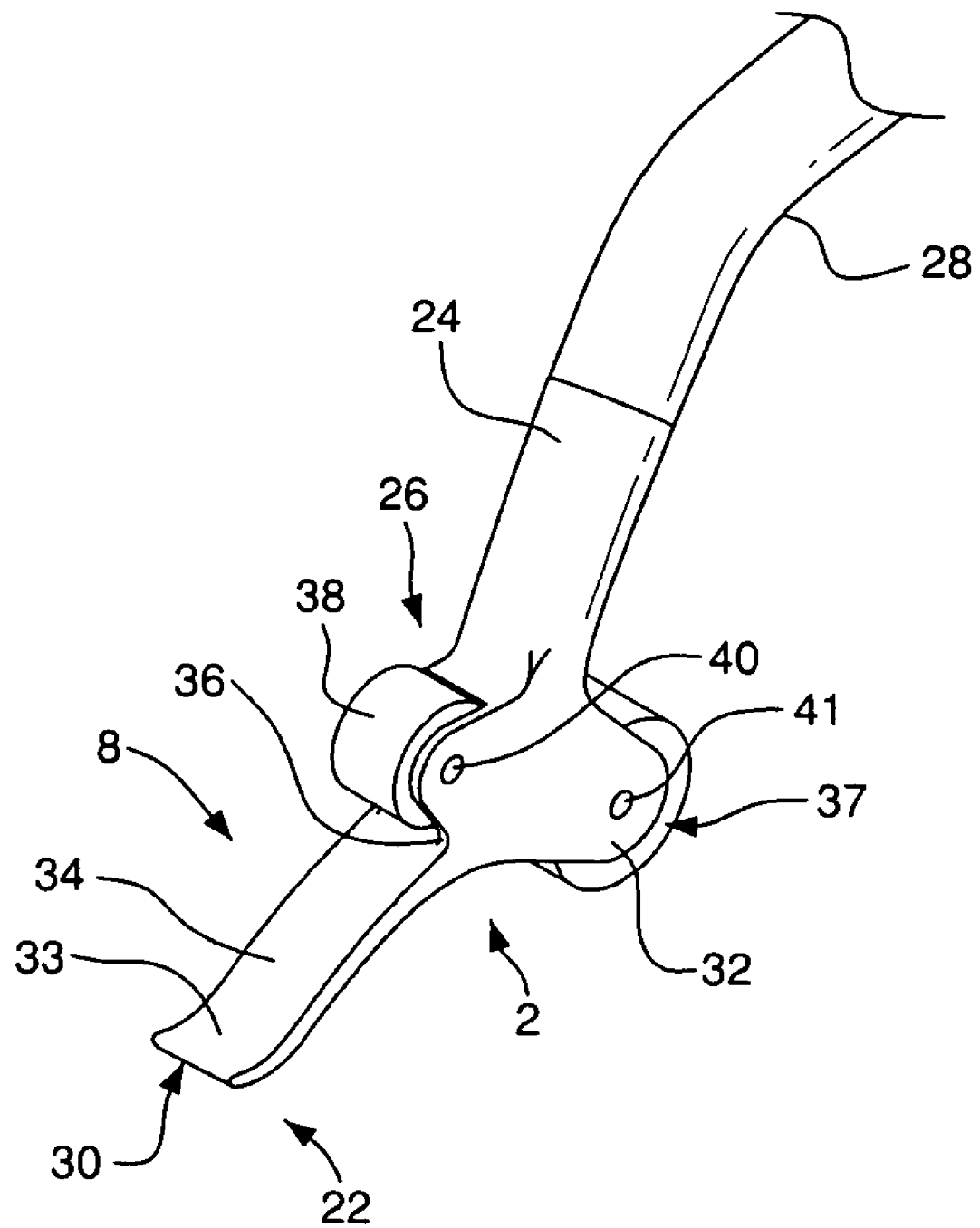

Referring to FIGS. 3*a* and 3*b*, first tool head 2 can comprise first and second ends 22, 24 and a central portion 26. The first end 22 may be a relatively thin, flat member that is configured for easy insertion between an upper (or lower) tire bead 14, 16 and the associated wheel rim flange 10 (see FIGS. 8 & 9). The second end 24 may be configured to engage a first end 28 of the handle 4. The central portion 26 may further have a heel section 32 disposed adjacent to the tire engaging surface 6 and a rim engaging notch 36 disposed adjacent to the rim engaging surface 8, which may serve, respectively, to retain the respective tire bead 14, 16 and wheel rim 10 in a desired relative position with respect to the tool head 2 during the tire installation and/or removal process.

It will be appreciated that although the first tool head 2 is described as being distinct and separate from the handle 4, the two may be integrally formed. Alternatively, the two pieces may be mechanically connected or joined, such as by pinning, press fitting, welding, etc. Likewise, second tool head 20 may be integral with, or joined or connected to, the handle 4 in a similar fashion to the first tool head 2. In one embodiment, the two pieces may be removably connected (e.g. pinned) so as to allow easy assembly and disassembly of pieces to facilitate storage and/or carriage of the tool (see FIG. 7).

As previously noted, the first end 22 of the first tool head 2 may have a pair of oppositely disposed tire and wheel rim engaging surfaces 6, 8. As shown in FIGS. 3*a, b*, the tire engaging surface 6 may have a slightly concave profile to facilitate retention of the tire bead 14, 16 on the tool surface 6 while the tire bead 14, 16 is being pulled over the wheel rim flange 10. In operation, the tire bead 14, 16 may slide along a portion of the tire engaging surface 6 slightly as it is being pulled over the wheel rim flange 10. Due to the concavity, this slight movement will be confined between the distal tip 30 of the first end 22 and a heel section 32 of the central portion 26 of the first tool head portion 2.

In one embodiment, the heel section 32 comprises a roller 37 to minimize friction between the tire 18 and the first tool head 2 during use. The roller 37 may be a single cylindrically shaped member having an axle 41 such as a pin or the like which is retained in the central portion 26 of the first tool head portion 2 by an interference fit. Alternatively, roller 37 may have a conical or spherical shape, and/or may include more than one roller, such as two or more spherical members, etc. The roller 37 can be made of any appropriate material such as soft metal, polymer, rubber, etc.

The wheel rim engaging surface 8 may comprise a convex portion 34 located between the first end 22 and the central portion 26 of the first tool head 2, and a notch portion 36 located adjacent the central portion 26 of the tool head 2. The rim engaging surface 8 may further have a concave section 33 located directly adjacent to the first end 22. The concave section 33 and the notch portion 36 are configured to engage the wheel rim flange 10 during different operations using the first tool head 2. Concave section 33 is configured to engage the wheel rim flange 10 when the tool 1 is used to install a tire 18 on the wheel rim 12, while the notch portion 36 engages the flange 10 during tire removal.

A roller 38 may be disposed adjacent to the notch portion 36 to provide a rolling surface for seating the wheel rim flange 10. In one embodiment, the roller 38 may be made from a non-metallic material (e.g., rubber or polymer). Using a non-metallic roller 38 may be particularly advantageous when removing or installing tires on wheel rims fabricated from aluminum, since such materials may be easily scratched or damaged by the tool 1, which may be made from steel or other relatively hard metal. In one embodiment the roller 38 may be a single cylindrically shaped member having an axle 40 such as a pin or the like which is retained in the central portion 26 of the first tool head portion 2 by an interference fit. Alternatively, the roller 38 may have a conical or spherical shape, and/or may include more than one roller, such as two or more spherical members, etc. The roller 38 can be made of any appropriate material such as soft metal, polymer, rubber, etc.

It is noted that rollers 37, 38 may be replaceable to allow the first tool head 2 to be refurbished to provide smooth long term use and operation. Such replacement can be easily accomplished through the removal/reinstallation of the press-fit pin 40, 41 associated with the roller. Additionally, in lieu of rollers, metal or non-metal wear surfaces may be provided, such as discretely shaped and sized pieces of material adhered or otherwise fixed to the tool head 2 that can be easily replaced when worn. In one example, solid or non-solid plugs of polymer material can be embedded in the appropriate tool surface to perform a function similar to that of one or more rollers.

The central portion 26 of the first tool head portion 2 may further comprise a heel section 32 that, in conjunction with concave surface 6 may serve to "contain" the tire bead 14, 16 when the tool 1 is being operated to install or remove the tire from the wheel rim. Thus, the tire engaging surface 6 is configured to physically engage the tire 18 to lift it up over the associated wheel rim flange 10. In addition, the notch 36 allows the tool 1 to be substantially fixed to the wheel rim 12 while allowing the tool 1 to rotate about the rim 12 to pry or lever the tire 18 off of the wheel rim 12, thus maximizing the engaging and lifting efficiency of the tool 1.

Figure 4A:
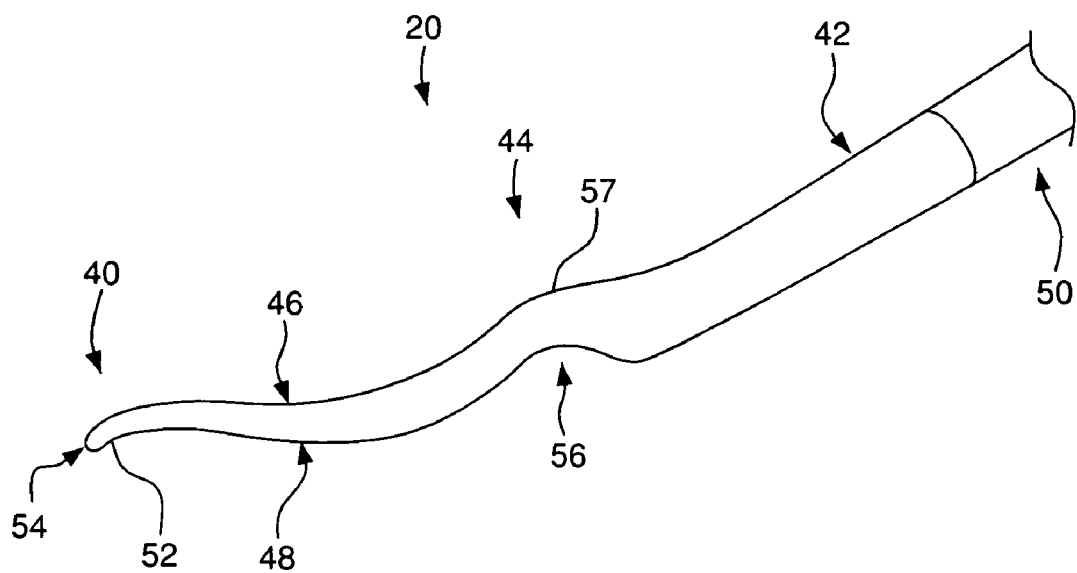
FIGS. 4a and 4b are side and isometric views of a second tool head of the tool of FIG. 1.
Figure 4B:
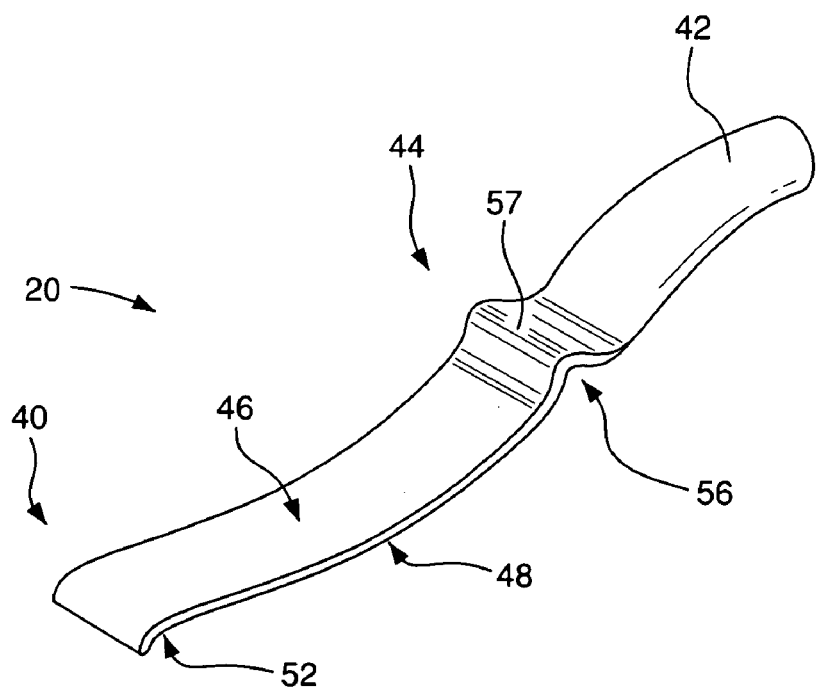

Referring to FIGS. 4*a* and 4*b*, second tool head 20 may comprise first and second ends 40, 42 and a central portion 44. The first end 40 may be a relatively thin, flattened, member that is easily insertable between an upper or lower tire bead 14, 16 and an associated wheel rim flange 10 (see FIG. 8). The second end 42 may be configured to engage a second end 50 of the handle 4. Oppositely disposed tire and wheel rim engaging surfaces 46, 48 may be disposed between the first end 40 and the central portion 44. The tire engaging surface 46 may have a generally concave shape to retain the upper or lower tire beads 14, 16 in a desired position between the first end 40 and the central portion 44 during operation. To further facilitate this retention feature, a raised portion 57 may be disposed adjacent the central portion 44 to prevent the tire from riding up along the tool handle.

The wheel rim engaging surface 48 may further have a first notch portion 52 disposed directly adjacent to the distal end 54 of the second tool head 20 for affirmatively engaging the wheel flange 10 when mounting the tire 18 on the wheel rim 12. A second notch portion 56 may be disposed adjacent the central potion 44 for affirmatively engaging the wheel rim flange 10 when removing the tire 18 from the wheel rim 12. Between the first and second notch portions 52, 56, rim engaging surface 48 has a generally convex shape. Thus, the tire and rim engaging surfaces 46, 48, including the first and second notch portions 52, 56, may operate to maintain the tire beads 14, 16 and the wheel rim flange 10 in a desired relative position during installation and removal of the tire 18 on the wheel rim 12, as will be explained in greater detail below.

Figure 5A:
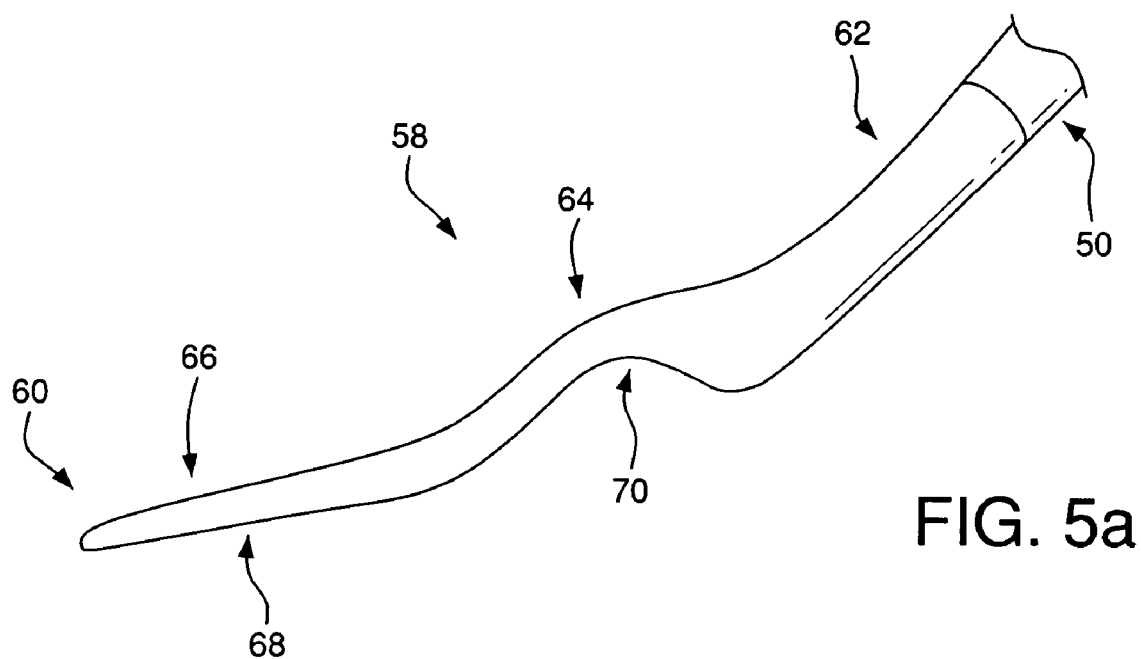
FIGS. 5a and 5b are side and isometric views of a third tool head of the tool of FIG. 1.
Figure 5B:
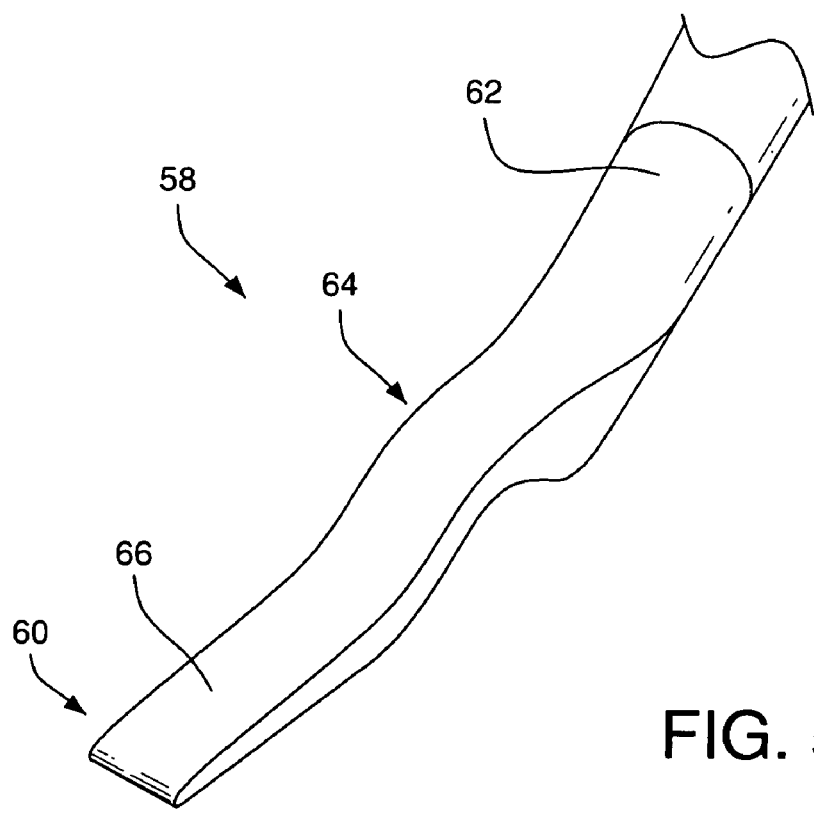
Figure 7:
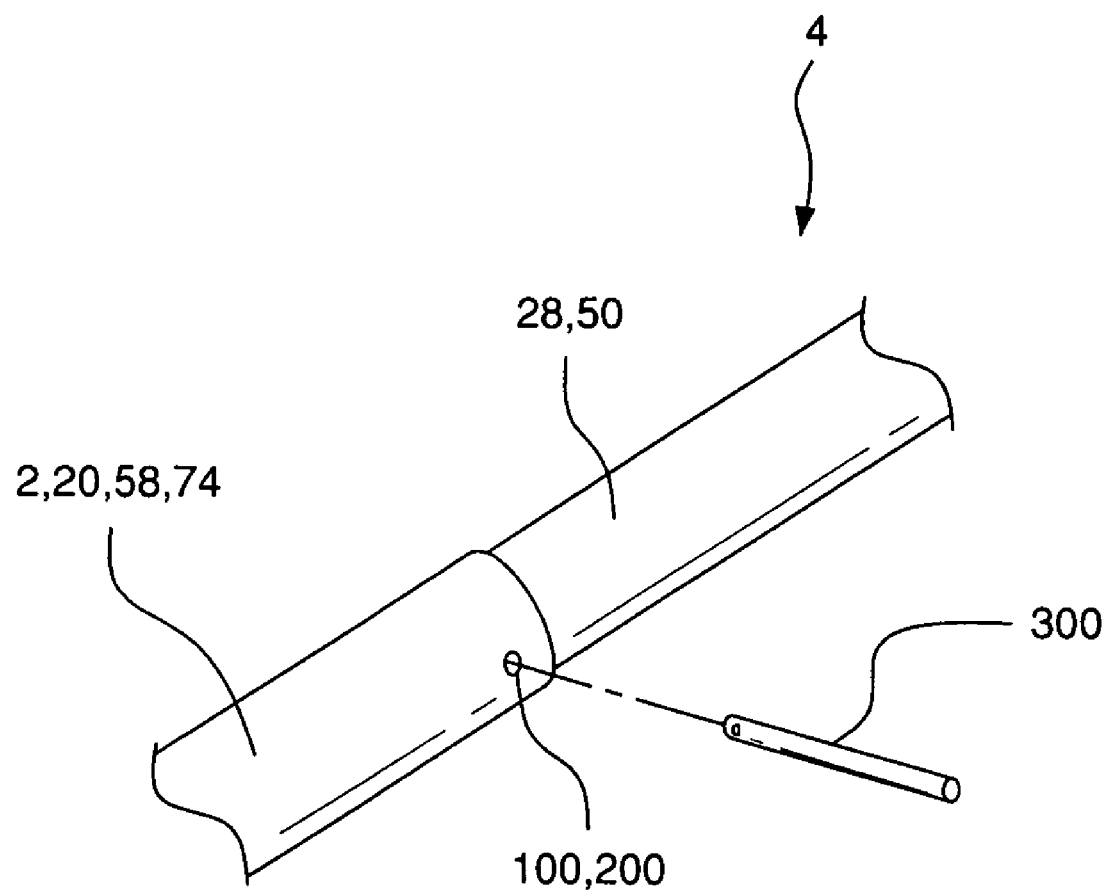
FIG. 7 is a detail view of a removable coupling for use with the tool of FIG. 1.

Referring to FIGS. 5*a* and 5*b*, an alternative third tool head 58 is disclosed. This third tool head 58 may be used as part of tool 1 in any desired combination with the first and second tool heads 2, 20 to obtain a tool 1 having the desired physical characteristics. It is noted that for convenience, the tool 1 may be provided with a single handle 4 and three or more removable tool heads 2, 20, 58 so that the user can mix and match tool heads to obtain a tool that best suits a particular size/shape tire and wheel. To this end, a removable coupling, such as that shown in FIG. 7, may be provided to allow the user to easily engage/disengage a desired tool head with the handle 4. FIG. 7 shows a pinned connection in which corresponding bores 100, 200 are provided in the handle and tool head, into which a removable pin 300 may be inserted. Alternatively, the tool heads 2, 20, 58, 74 may be provided with individual, separate, handles so that they each may be used independent of one another.

Referring again to FIGS. 5*a, b*, the third tool head 58 may comprise first and second ends 60, 62 and a central portion 64. The first end 60 may comprise respective tire and wheel rim engaging surfaces 66, 68. At least a portion of the tire engaging surface 66 may be generally concave, while the rim engaging surface 68 may be substantially flat. The rim engaging surface 68 may further comprise a rim engaging notch 70 disposed adjacent the central portion 64. The tire engaging surface 66 may further comprise a raised portion 72 positioned adjacent the central portion 64 to retain a tire bead 14, 16 during operation. The second end 62 of the third tool head 58 may be configured to engage the second end 50 of the handle in a manner similar to that described for the first and second tool heads 2, 20.

The third tool head 58 may be particularly well suited for use in removing a tire from its associated wheel rim due to the substantially flat shape of its first end 60, which allows it to be easily driven down between the tire 18 and the wheel rim 12 and positioned beneath the lower tire bead 16. It can then be used easily to lift the lower tire bead 16 up over the wheel rim flange 10). Because the third tool head 58 does not have a notched or hooked geometry at its first end 60 (see, e.g., notch portions 36, 52 of the first and second tool heads 2, 20, respectively), it is less likely to "hang up" on the lower bead 16 or the lower rim flange when being driven down under the lower bead 16.

Figure 6A:
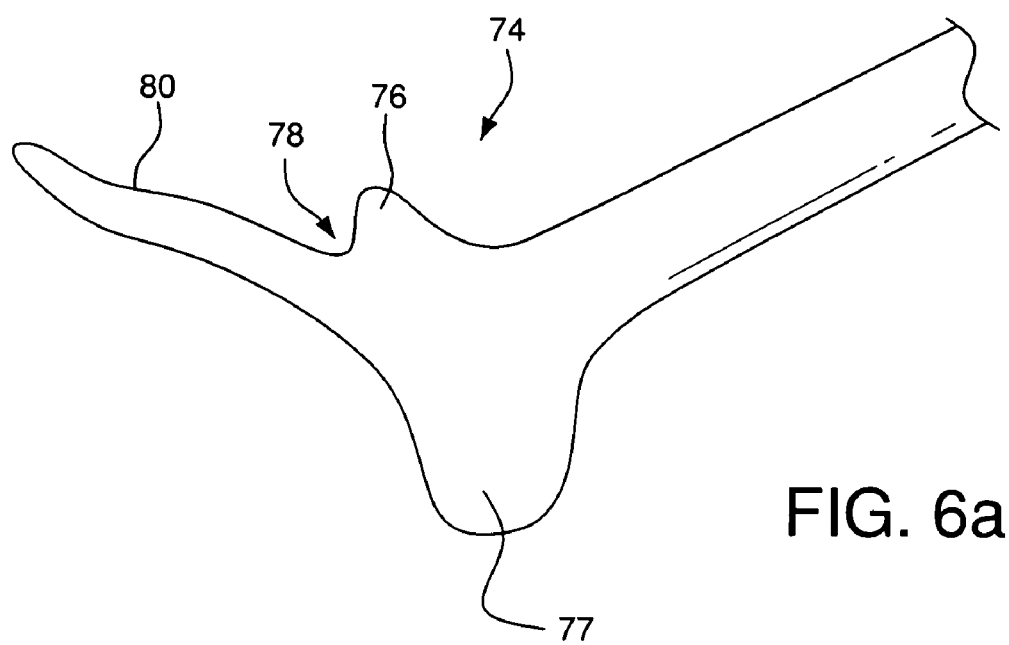
FIGS. 6a and 6b are side and isometric views of an alternative embodiment of the tool head of FIGS. 3a and 3b.
Figure 6B:
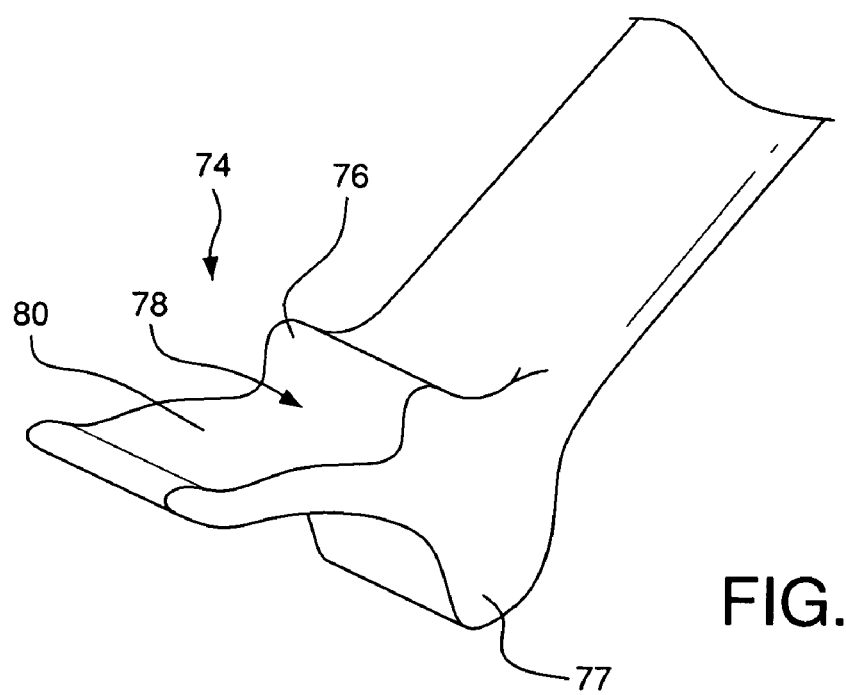

Referring to FIGS. 6*a* and 6*b*, a further alternative tool head 74 is shown. Tool head 74 may be similar in all respects to the first tool head 2 of FIGS. 3*a* and 3*b*, with the exception that steel projection members 76, 77 may be provided in lieu of roller members 37, 38. This simplified arrangement may result in a simpler and less expensive construction compared to tool head 2, and may be suitable for use with wheels made of hard materials (e.g., steel), where scratching of the wheel rim due to interaction with the tool is not a concern. These solid projection members 76, 77 may be formed integral to the body of the tool heat 74, or they may be separate pieces that are mechanically joined to the body. In one embodiment, the projection members 76, 77 may be short segments of steel pipe that are welded to the body of the tool head 74.

Figure 14:
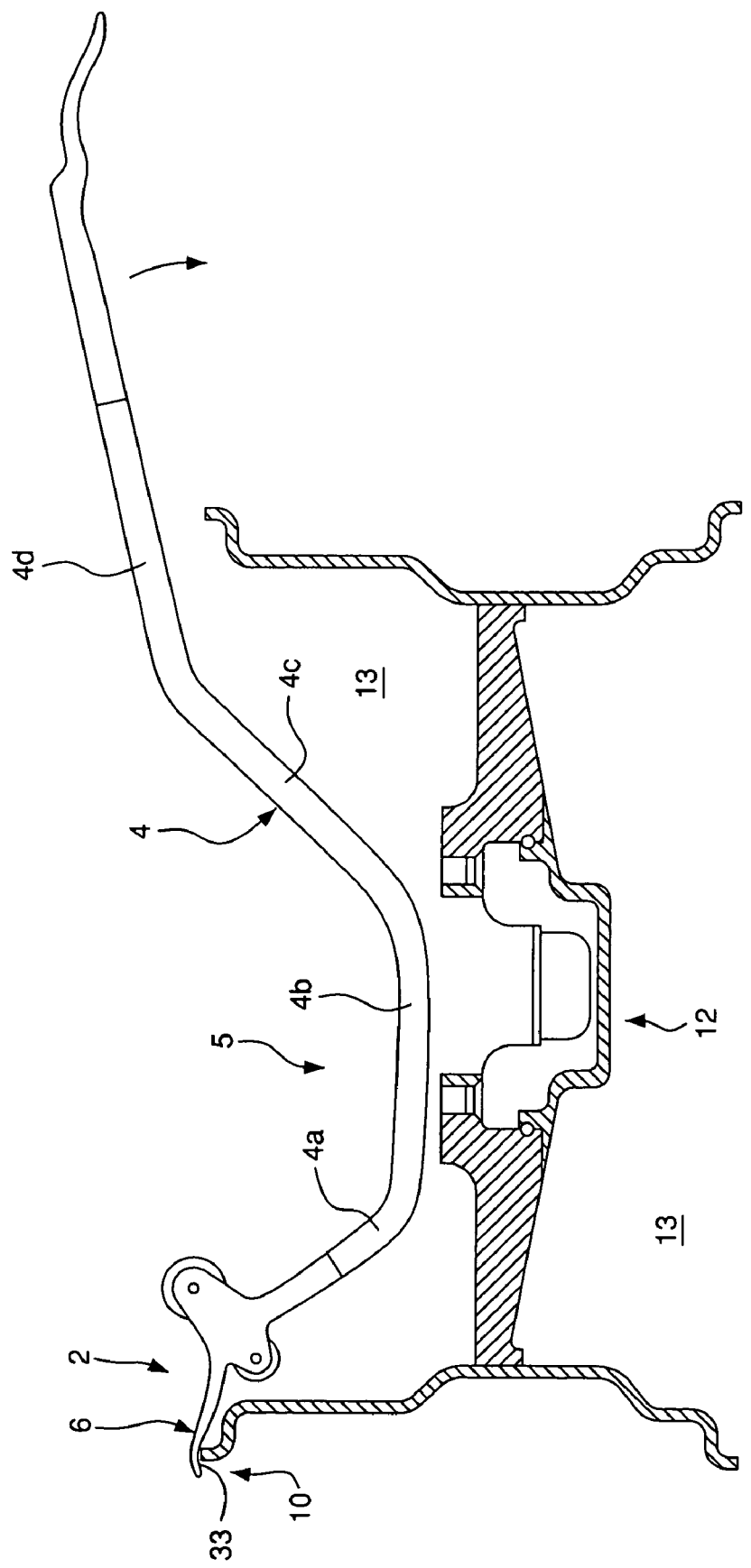
FIG. 14 is a side view of the tool of FIG. 1, showing an exemplary positioning of the handle of the tool of FIG. 1, positioned in relation to an exemplary wheel rim.

Referring again to FIG. 1, handle 4 of tool 1 may have a substantially U-shaped or otherwise offset portion 5 to allow at least a portion to be received within the front or rear spacing area 13 of the wheel rim 12 when the tool 1 is levered to remove a tire 18 from the wheel rim 12 (see also FIG. 14). This is of great advantage over current tools having straight handles because it combines the benefits of a long handle length (thus providing increased mechanical advantage over shorter handles) with preventing or minimizing interference between the handle and the wheel rim flange when the tool is used to remove a tire from a rim. Thus, the tool head(s) can be rotated over a greater arc with a substantially longer handle as compared to current straight handles. FIG. 14 shows the tool 1 in nearly the fully rotated (i.e.,. fully "levered") position. As can be seen, the offset portion 5 of the handle 4 is fully received within the spacing area 13 of the wheel rim 12. This offset handle is of distinct advantage when removing tires from wheel rims on utility or construction vehicles such as backhoes, etc.

In the illustrated example of FIG. 14, offset portion 5 is formed by dividing the handle 4 into four distinct portions 4*a–d*, each of which is angled with respect to an adjacent portion. This arrangement is merely one example, and others are also possible, such as providing the handle with a smooth "S"-shaped or "C"-shaped curve. Further, the tool handle 4 may be customized to a particular application, so that the degree of offset particularly sized to fit a particular wheel size and/or geometry. For example, it may be expected that a handle 4 for use in removing/installing backhoe tires would be sized differently from a handle 4 used to remove double-width (super-single) truck tires. The important and consistent feature of such handles 4 is that they be sized so that at least a portion of the handle be received within a front or rear spacing area 13 of the wheel rim 12 so that a substantially longer handle can be used compared to present handles, without resultant interference with the wheel rim.

Figure 9:
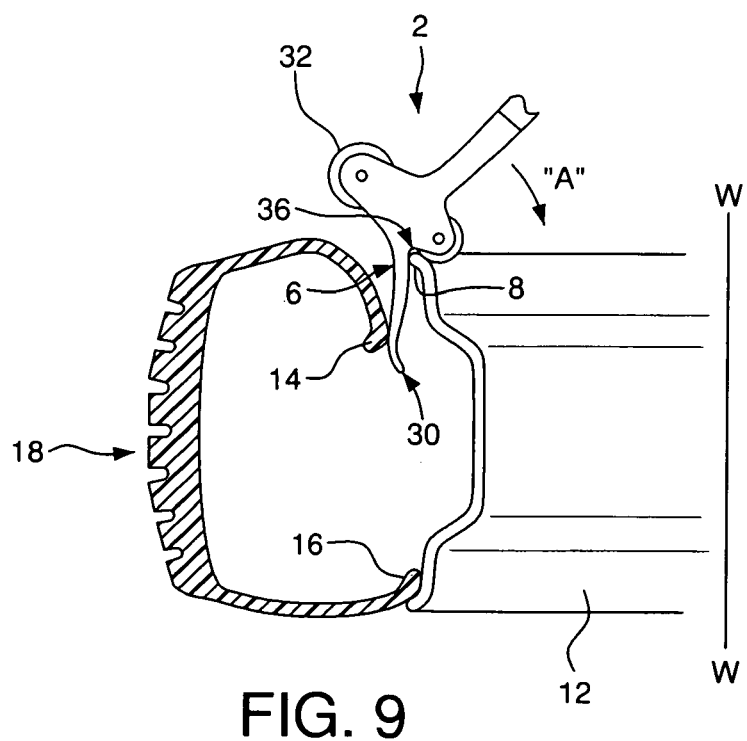
FIG. 9 is a cross-sectional view through a section of the tire and wheel rim, showing the tool head of FIGS. 3a, b engaged with the tire and wheel rim.
Figure 10:
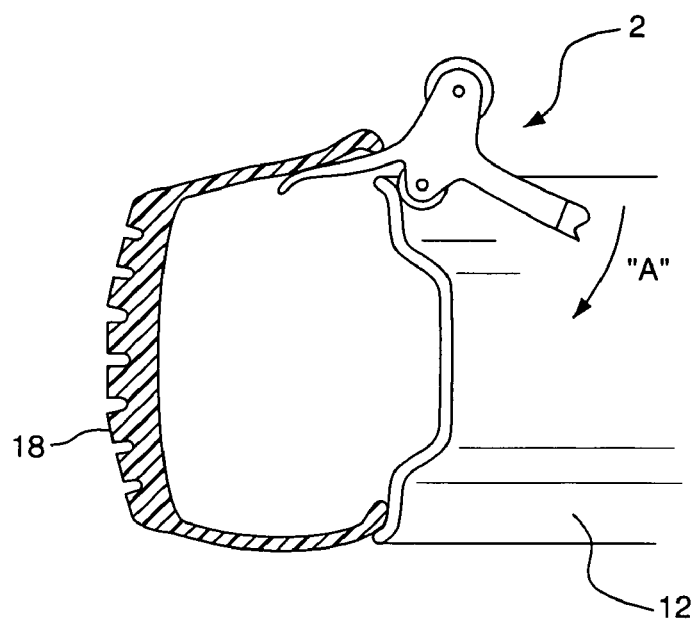
FIG. 10 is a cross-sectional view through a section of the tire and wheel rim, showing the tool head of FIGS. 3a, b in the partially rotated position pressing a lower bead of the tire toward a top flange of the wheel rim.
Figure 11:
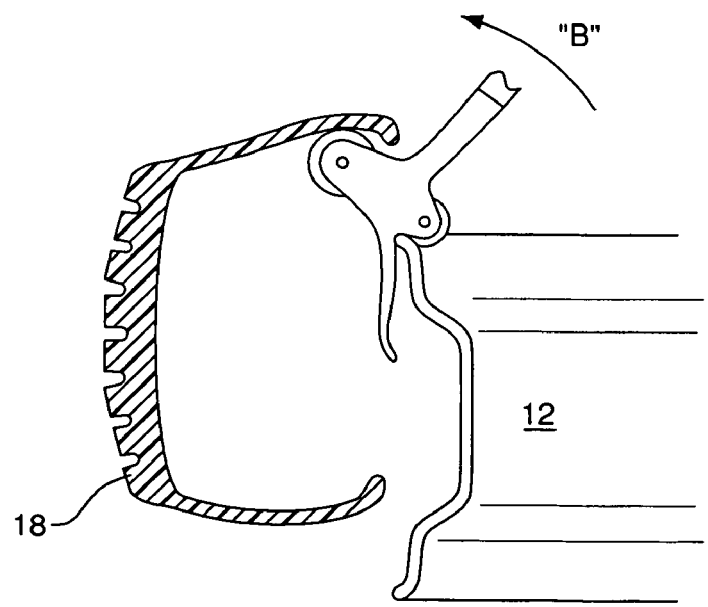
FIG. 11 is a cross-sectional view through a section of the tire and wheel rim, showing the tool head of FIGS. 3a, b lifting the entire upper tire bead over the top flange of the wheel rim.
Figure 12:
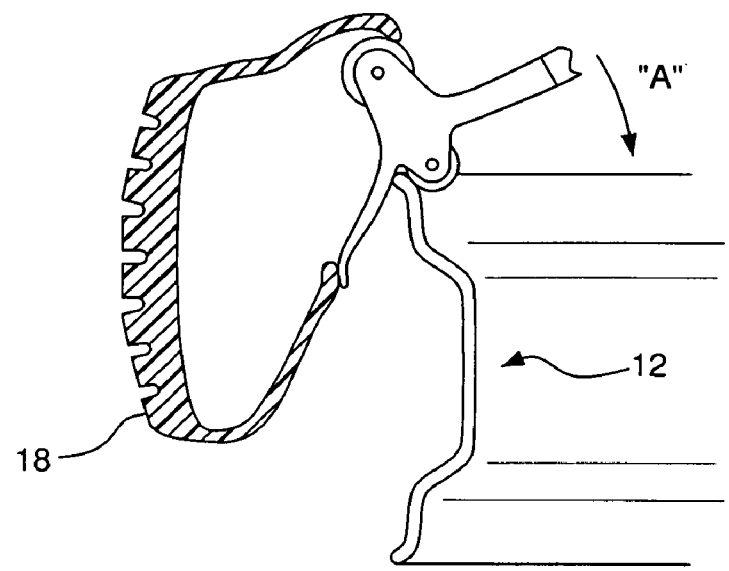
FIG. 12 is a cross-sectional view through a section of the tire and wheel rim, showing the tool head of FIGS. 3a, b engaged with the lower tire bead and the wheel rim.
Figure 13:
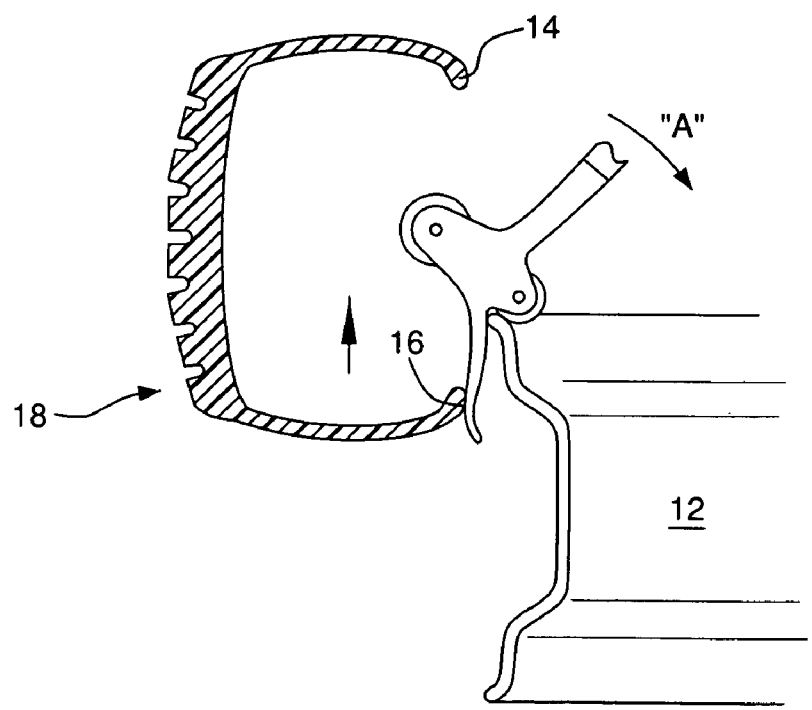
FIG. 13 is a cross-sectional view through a section of the tire and wheel rim, showing the tool head of FIGS. 3a, b pressing the lower tire bead over the top flange of the wheel rim.

Referring to FIGS. 8–13, removal of a tire 18 from an associated wheel rim 12 using the first tool head 2 of FIGS. 3*a, b* will be described in greater detail. In use the first tool head 2 is oriented so that the distal tip 30 of the first end 22 points generally downward toward the tire/wheel interface. The distal tip 30 is then pressed into the joint between the wheel rim 12 and the upper bead 14 of the tire 18 to break the seal between the bead and the rim. (Alternatively, a separate bead breaking tool may be used to initially break the seal between the tire and the rim.) The first tool head 2 is then pressed further down between the rim and tire until the notch 36 contacts the upper flange 10 of the rim 12 (FIG. 9). Once the first tool head 2 is fully engaged with the tire and rim, as shown in, the tool handle 4 can be levered in the direction of arrow "A" to impart an upward force on the tire's upper bead 14 (via the tire engaging surface 6), and through the continued application of force the upper bead 14 is slid up and over the upper flange 10 of the rim 12, disengaging the upper bead 14 from the wheel rim 12 (FIG. 10). Once the upper bead 14 has been slid up and over the upper flange 10, the handle 4 is then rotated in the opposite direction (shown as arrow "B" in FIG. 11) so that the upper bead 14 slides over the heel section 32 and the distal tip 30 of the first end 22 is positioned underneath the second bead 16 (FIG. 12). Once the tire engaging surface 6 engages the lower bead 16, the handle 4 is again levered in the direction of arrow "A" to impart an upward force on the lower bead 16. Note that during the steps of FIGS. 10 and 13, the offset portion 5 of the tool handle 4 will reside at least partially within the front or rear spacing area 13 of the wheel rim 12, as shown in FIG. 14. Again, this allows for a substantially increased rotation of the tool head 2, while also allowing the use of a longer handle which increases the leverage force available for prying the tire 18 up over the rim flange 10. This increase leverage may be very important when removing tires from larger vehicles, such as trucks and construction machinery.

Figure 15:
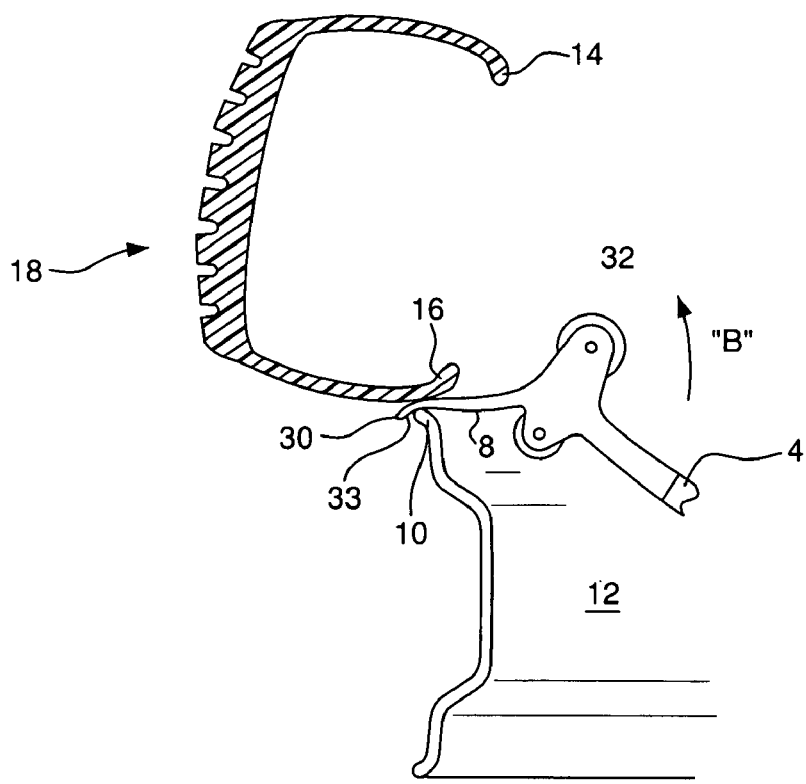
FIGS. 15–18 are cross-sectional views through a section of the tire and wheel rim, showing the tool head of FIGS. 3a, b pressing the lower and upper tire beads over the top flange of the wheel rim.
Figure 16:
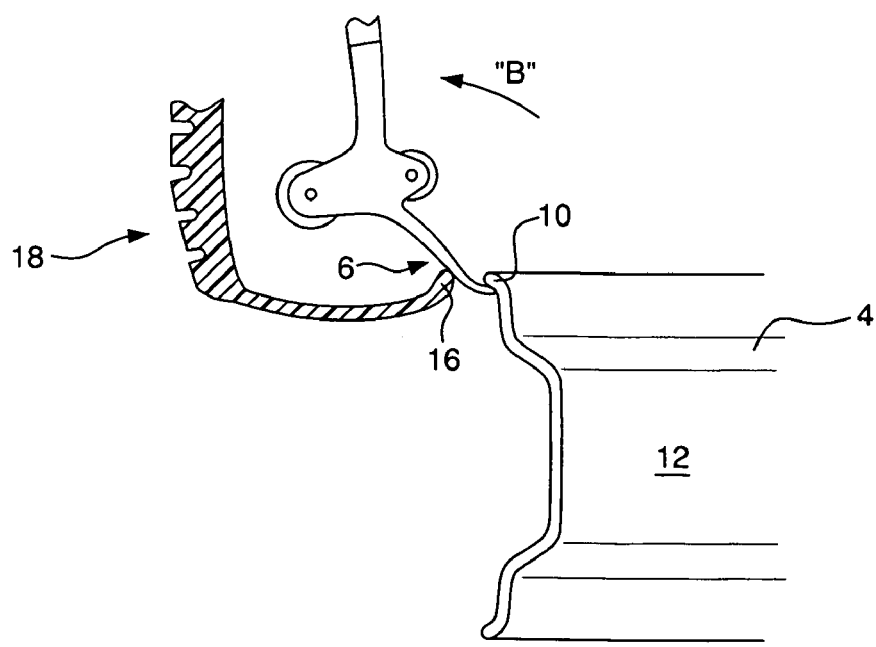

Referring to FIGS. 15–18, the tire placed loosely on top of the wheel rim 12 so that the bottom bead 16 of the tire sits on the upper flange 10 of the wheel rim 12. With heel section 32 pointing upward (away from the wheel rim) and the first end 22 pointing toward the interface between the tire and rim, the distal tip 30 is inserted between the tire 18 and rim 12 just far enough so that the concave portion 33 of the rim engaging surface 8 engages the wheel rim flange 10 (FIG. 15). It will be noted that at this point, the tool 1 will also be positioned with respect to the wheel rim 12 substantially as shown in FIG. 14, such that the offset portion 5 of the handle 4 resides at least partially within the front or rear spacing area 13 (depending on which side of the wheel is being presented to the user). Thus, the concave portion 33 will be engaged with the wheel rim flange 10 and the tire engaging surface 6 will contact the lower tire bead 16. Thereafter, using the wheel rim flange 10 as a fulcrum, the handle 4 is levered out of the spacing area 13 in the direction of arrow "B." As this occurs, the tire engaging surface 6 presses down on the lower bead to press it down over the upper rim flange 10 (FIG. 16). Typically this operation may result in only a portion of full circumference of the bottom tire bead 16 being pressed down over the wheel rim flange 10 (i.e., the portion of the tire bead located beneath the tire engaging surface 6). In order to press the full circumference of the bottom tire bead 16 down over the upper rim flange 10, the tool 1 may be "walked around" the inside of the wheel rim—repeating the above identified levering process—to incrementally install the bottom bead 16 over the upper wheel rim flange 10.

Figure 17:
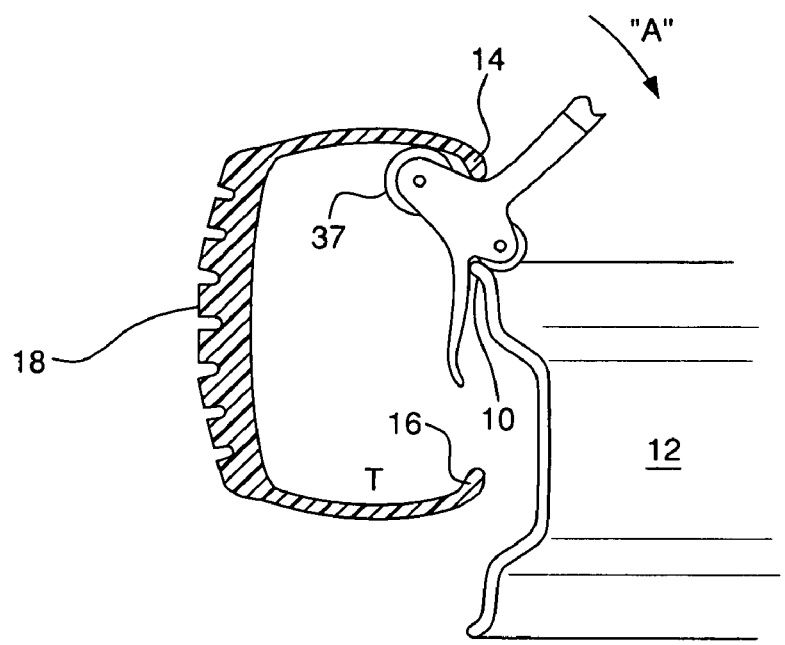
Figure 18:
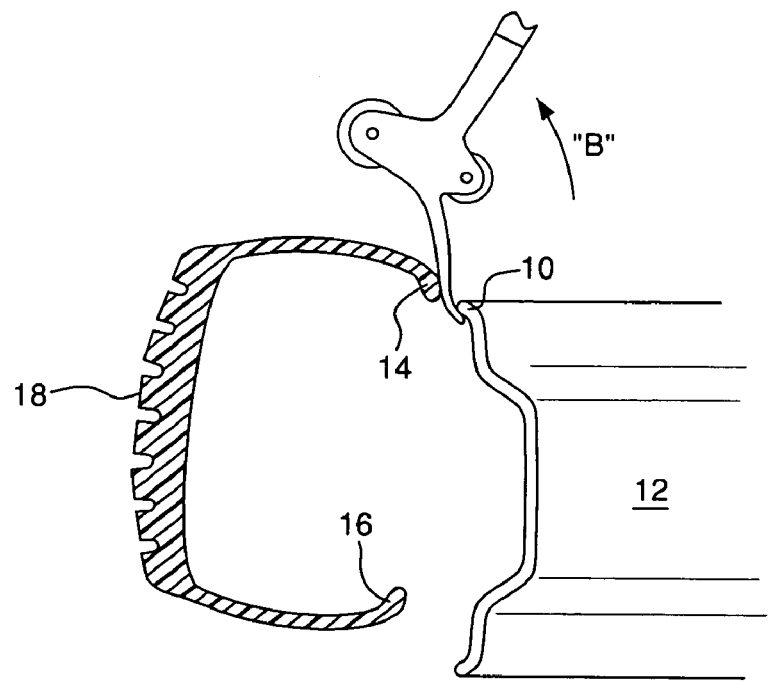

Once the bottom bead 16 is completely installed, the tire 18 will "fall down" onto the wheel rim 12 until the top bead 14 engages the top of the upper wheel rim flange 10. The top bead 14 will also lie on top of the heel section 32 of the tool head 2 (FIG. 17). The handle 4 may then be levered back toward the wheel space 13 in the direction of arrow "A" so that the top bead 14 can slide over the heel section 32. This sliding operation may be further facilitated if roller 37 is provided on heel section 32. It will be appreciated that this sliding operation will be facilitated by the presence of roller 37. Once the heel section 32 is positioned above the top bead 14, the tire engaging portion 6 is again engaged with the top bead 14. The handle 4 may then be levered in the direction of arrow "B" to press the top bead 14 down over the top flange 10 of the wheel rim 12 (FIG. 18). Again, during this operation the concave portion 33 of the first tool head 2 engages the wheel rim flange 10, acting as a fulcrum for rotating the tool head 2. And as with the installation of the lower tire bead 16, the tool may again be "walked" around the circumference of the wheel rim 12 to incrementally press the top bead 14 over the wheel rim flange 10.

Figure 19:
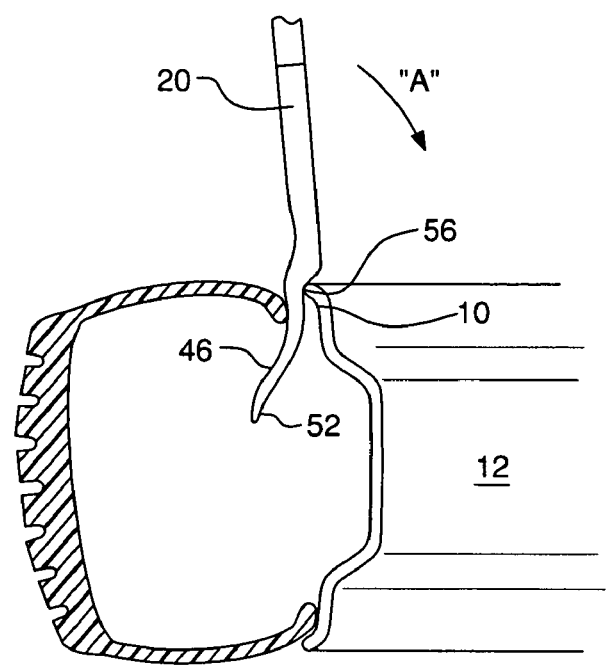
FIGS. 19–21 are cross-sectional views through a section of the tire and wheel rim, showing the tool head of FIGS. 4a, b pressing the lower and upper tire beads up over the top flange of the wheel rim to remove the tire from the rim.
Figure 20:
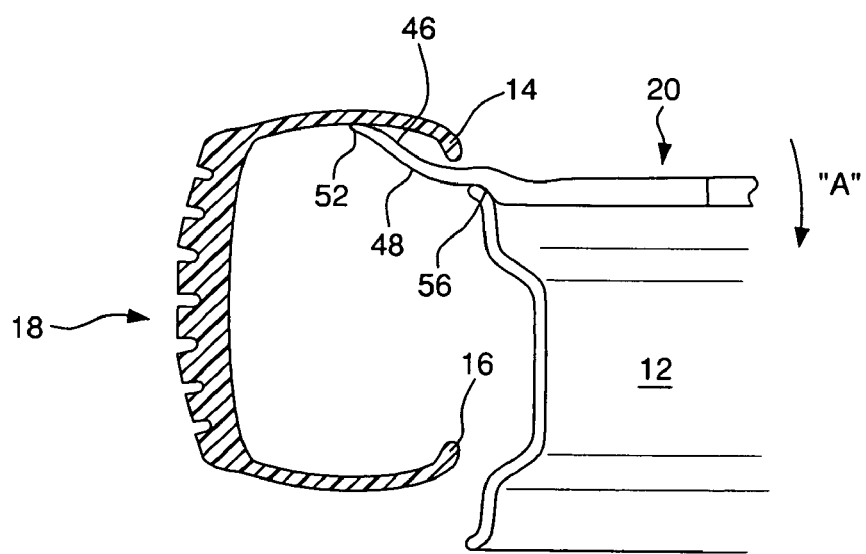
Figure 21:
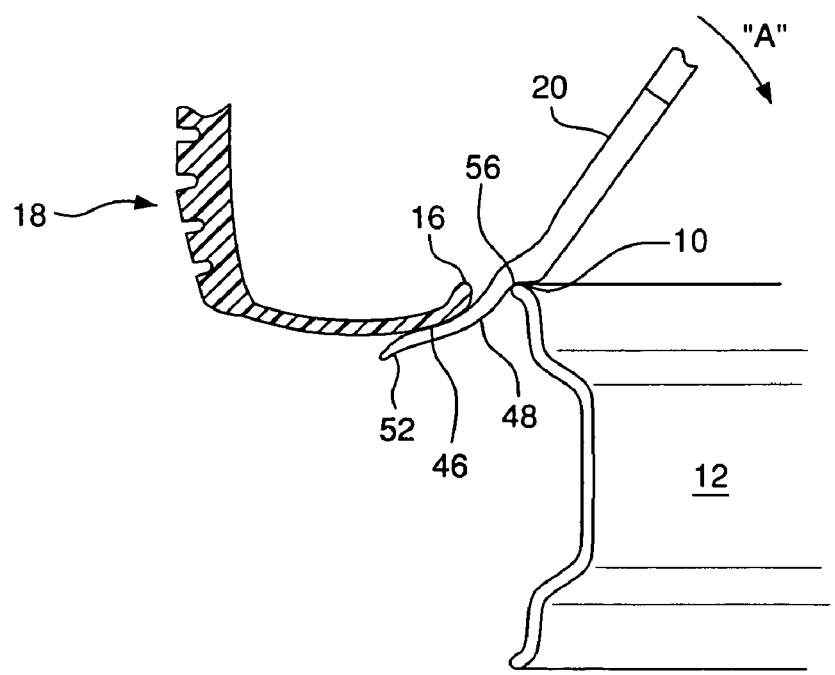

Referring to FIGS. 19–21, the tire removal process using the second tool head 20 will now be described in greater detail. (It is noted that the third tool head 58 (FIGS. 5a, b) may be used to remove a tire 18 from an associated wheel rim 12 in substantially the same manner as with second tool head 20. For ease of description, however, reference in the following section will be made only to the second tool head 20).

The tire removal process proceeds substantially the same as that described in relation to that of the first tool head 2 in FIGS. 8–13 above. The second tool head 20 is oriented so that its distal end 54 points generally toward the tire/rim interface. The second tool head 20 may then be driven between the wheel rim flange 10 and the upper bead 14 until the second notch portion 56 of the head is engaged with the wheel rim flange 10 (FIG. 19). Once the second tool head 20 is fully engaged with the tire and rim, the tool handle 4 can be levered in the direction of arrow "A" to impart an upward force on the tire's upper bead 14 (via the tire engaging surface 46), and through the continued application of force the upper bead 14 is slid up and over the upper flange 10 of the rim 12, disengaging the upper bead 14 from the wheel rim 12 (FIG. 20). Once the upper bead 14 has been slid up and over the upper flange 10, the handle 4 may be rotated in the opposite direction and the distal end 54 of the tool head 20 is positioned beneath the second bead 16 (FIG. 21). The handle 4 is once again levered in the direction of arrow "A" to impart an upward force on the lower bead 16. It will be appreciated that during the step of FIG. 20 the offset portion 5 of the tool handle 4 will reside at least partially within the front or rear spacing area 13 of the wheel rim 12, as shown in FIG. 14. Again, this allows for a substantially increased rotation of the tool head 20, while also allowing the use of a long handle which increases the leverage force available for prying the tire 18 up over the rim flange 10. This increased leverage may be very important when removing tires from larger vehicles, such as trucks and construction machinery.

In one embodiment of the tire removal process, two or more second tool heads 20 may be used at one time to remove each bead 14, 16 of tire 18. This may be an advantage because only a portion of the total circumference of the upper and lower tire beads 14, 16 may be pried up over the upper wheel rim flange 10 with each rotation (or "levering") of a single tool head 20. This may be particularly true when removing very large tires (e.g. backhoe tires) from their wheel rims. Thus, where two tools at a time used to remove top bead 14, both tool heads 20 may be placed at spaced apart locations and driven down between the rim and tire until their respective second notch portions 56 are engaged with the wheel rim flange 10; the pair of tool heads 20 may then levered backwards either simultaneously or in succession to pry a larger portion of the circumference of the upper bead 14 over the upper rim flange 10. Thereafter, one of the tool heads 20 may be left in place, while the other is moved to a new location on the rim flange 10 and again levered to fully remove the circumference of the upper bead 14 from the wheel rim flange 10.

In a further alternative embodiment, once the upper bead 14 is removed from the rim flange 10, the tire and wheel may be turned over, and second tool head 20 (or third tool head 58) may be inserted between the lower bead 16 and the upper rim flange 10 from the reverse side of the wheel. Again, the tool head 20, 58 may be driven in until rim engaging notch 70 (FIG. 5a) engages the rim flange 10. A single levering movement can then be used to remove the lower bead 16 from the upper rim flange 10. This levering movement may be further facilitated by turning the tire over again to its original position while the tool head 20, 58 is engaged with the wheel and rim, and "popping" the bottom bead 16 up off the wheel rim flange 10.

Figure 22:
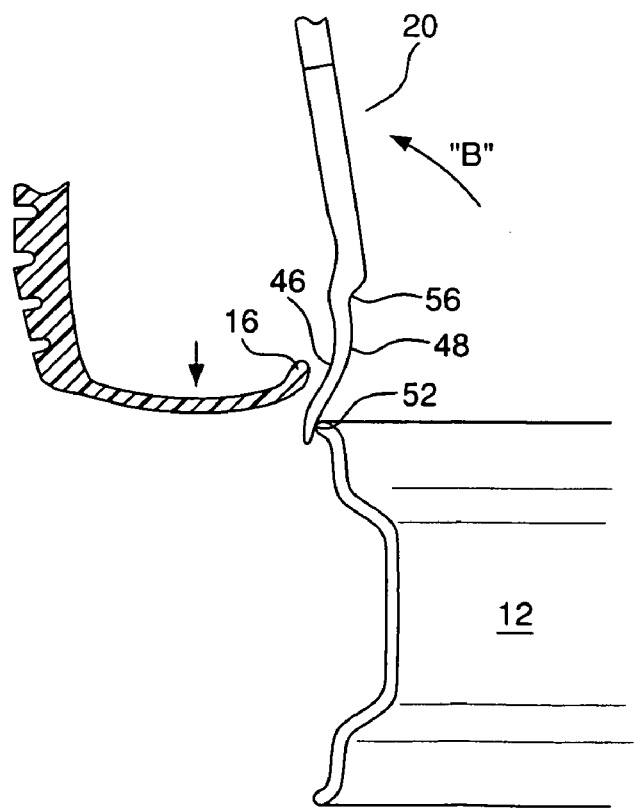
FIGS. 22–23 are cross-sectional views through a section of the tire and wheel rim, showing the tool head of FIGS. 4a, b pressing the lower and upper tire beads down over the top flange of the wheel rim to install the tire on the rim.
Figure 23:
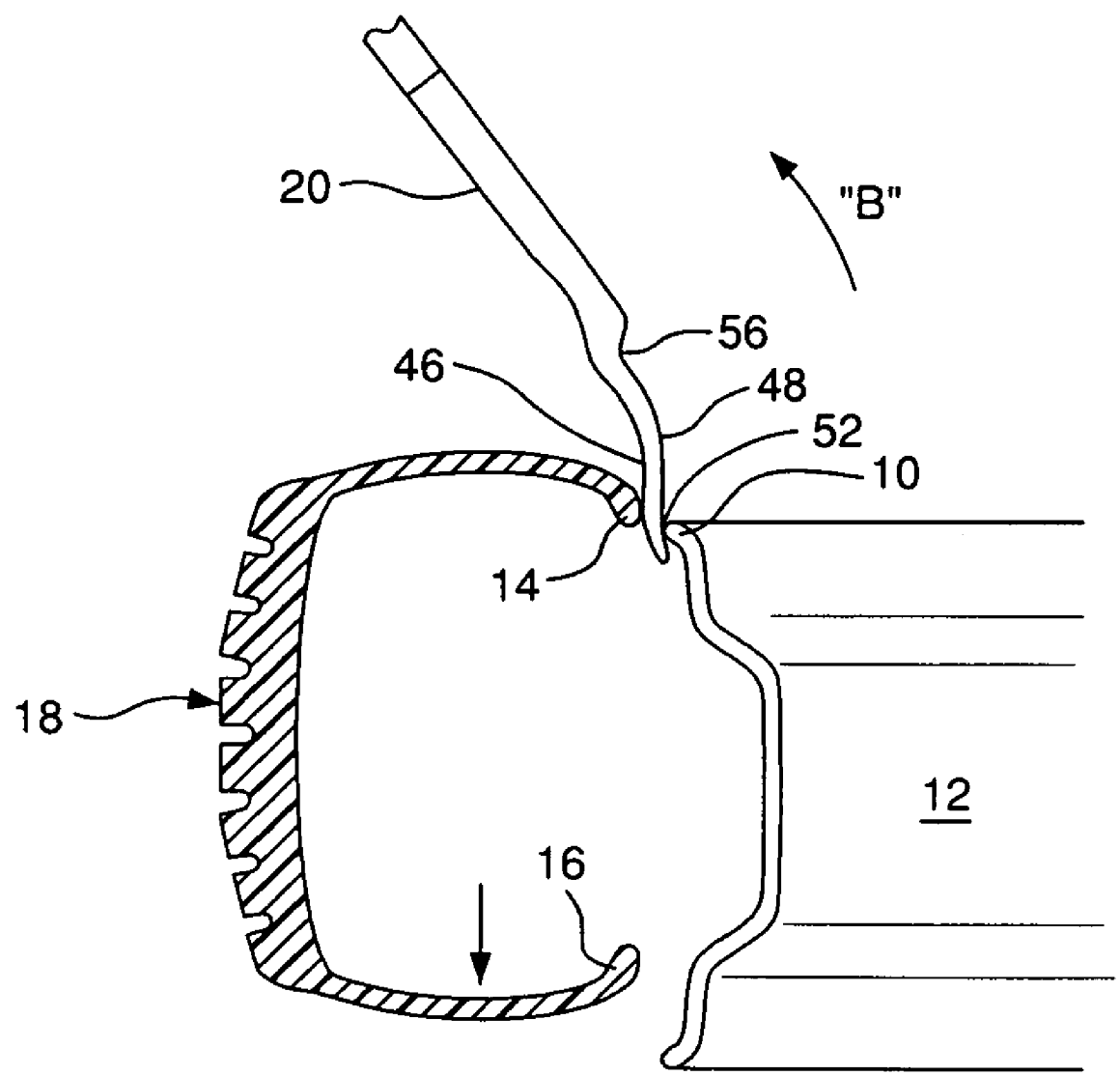

Referring to FIGS. 22 & 23, the tire installation process using second tool head 20 will now be described in greater detail. This process is substantially similar to the installation process using first tool head 2. Initially, the tire 18 is first placed loosely on top of the wheel rim 12 so that the bottom bead 16 of the tire sits on the upper flange 10 of the wheel rim 12. With the distal end 54 of the second tool head 20 pointed toward the tire/rim interface, the handle is used to drive the tool head down into the interface. The second tool head 30 is inserted just far enough so that the first notched portion 52 of the rim engaging surface 48 engages the wheel rim flange 10 (FIG. 22). Thereafter, using the wheel rim flange 10 as a fulcrum, the handle 4 is levered in the direction of arrow "A," pressing tire engaging surface 46 down on the lower bead 16 to pushing it it down over the upper rim flange 10. Since, as noted previously, this operation may result in only a portion of full circumference of the bottom tire bead 16 being pressed down over the wheel rim flange 10, the tool 1 may be "walked around" the inside of the wheel rim—repeating the levering process—to incrementally install the bottom bead 16 over the upper wheel rim flange 10.

Once the bottom bead 16 is completely installed, the tire 18 will "fall down" onto the wheel rim 12 until the top bead 14 engages the top of the wheel rim 12. The second tool head 20 may be readjusted so that the first notch portion 52 again engages the upper rim flange 10 (FIG. 23), whereupon the handle 4 may then again be levered in the direction of arrow "B" to press the top bead 14 down over the top flange 10 of the wheel rim 12 (FIG. 23). And as with the installation of the lower tire bead 16, the tool head 20 may again be "walked" around the circumference of the wheel rim 12 to incrementally press the top bead 14 over the wheel rim flange 10.

As part of any or all of the above installation and/or removal steps, an appropriate oil or other lubricant may be applied to the tire surface immediately adjacent to the beads in order to reduce the friction between the upper and lower beads 14, 16 the upper flange 10 of the rim 12 and the respective tool head.

The tool 1 is particularly well suited for removing tires from modern wide truck wheels, such as those used with new single tires that are designed to take the place of two standard tires (e.g. the X One XTE tire by Michelin). Tires of this size can have depths up to twice that of standard dual tires (see dimension "D" in FIG. 3). The present tool 1 having offset handle 4 may be configured to minimize interference between the handle and the wheel rim 12, thus enabling easier manipulation of a tire with respect to such wheel rims as compared to present straight-handled tools.

The tool 1 also may advantageously allow the user to change a tire while the wheel is still mounted on the vehicle. This is a desirable feature, particularly when using the tool to replace tires on construction vehicles, because the removing the wheel rim from the vehicle can be a time consuming an difficult operation itself. In such applications, the tool 1 may be used in conjunction with a bead holding tool such as that disclosed in U.S. Pat. No. 6,269,861 to Loi Van Tran, titled "Tire Removal and Installation Tool." The bead holding tool can be used to maintain the relative positions between the tire bead and rim flange on one side of the wheel while simultaneously inserting the one of the tool heads of tool 1 between the tire bead and the rim flange on the opposite side of the wheel and prying the tire bead over the rim. This is particularly helpful in cold, icy, weather conditions, in which the tire rubber may be less pliable, and where the danger of the operator slipping on icy ground is increased.

Accordingly, it should be understood that the embodiments disclosed herein are merely illustrative of the principles of the invention. Various other modifications may be made by those skilled in the art which will embody the principles of the invention and fall within the spirit and the scope thereof.

The invention claimed is:

1. A tool head and a handle, said tool head having a tire engaging surface and a wheel rim engaging surface, said tool head being connected to a first end of said handle;
   wherein said handle has a substantially U-shaped portion positioned adjacent said tool head, said substantially U-shaped portion being sized and configured to be received within a space formed between first and second diametrically opposed surfaces of a wheel rim when said wheel rim engaging surface is engaged with said wheel rim; and
   wherein said substantially U-shaped portion of said handle comprises: (i) a first handle segment having a first axis oriented at a first angle with respect to a longitudinal axis of said tire tool, and (ii) a second handle segment having a second axis oriented at a second angle with respect to said longitudinal axis; wherein said first and second angles are oblique angles.

2. The tire tool of claim 1, wherein at least a portion of said tire engaging surface is concave and said wheel rim engaging surface comprises a lip for engaging a flange portion of said wheel rim.

3. The tire tool of claim 2, wherein said rim engaging surface further comprises a roller member having a pin axis oriented substantially perpendicular to a longitudinal axis of said tire tool.

4. The tire tool of claim 3, wherein said roller member comprises a rubber or polymer material.

5. The tire tool of claim 2, wherein said tire engaging surface further comprises a protrusion configured to maintain a tire bead of a tire positioned on said concave portion of said tire engaging surface during operation.

6. The tire tool of claim 5, wherein said protrusion further comprises a roller member having a pin axis oriented substantially perpendicular to a longitudinal axis of said tire tool.

7. The tire tool of claim 1, further comprising a second tool head connected to said handle at a second end of said handle, said second tool head having a tire engaging surface and a wheel rim engaging surface, at least a portion of said tire engaging surface being concave, and said wheel rim engaging surface further comprising a recess for receiving a flange portion of said wheel rim.

8. The tire tool of claim 1, wherein said tool head is removably engageable with said handle.

9. A tool head and a handle, said tool head having a tire engaging surface and a wheel rim engaging surface, said tool head being connected to a first end of said handle;
   wherein said handle has a substantially U-shaped portion positioned adjacent said tool head, said substantially U-shaped portion being sized and configured to be received within a space formed between first and second diametrically opposed surfaces of a wheel rim when said wheel rim engaging surface is engaged with said wheel rim; and
   wherein said substantially U-shaped portion of said handle comprises: (i) a first handle segment having first and second ends, said first end associated with said tool head, said second end being laterally offset from a longitudinal axis of said tire tool by a first distance, and (ii) a second handle segment having third and fourth ends, said third end associated with said second end of said first handle segment, and said fourth end being laterally offset from said longitudinal axis by a second distance, said second distance being smaller than said first distance.

10. The tire tool of claim 9, wherein when the tire engaging surface and the wheel rim engaging surface of said tool head are engaged with a wheel rim and tire, respectively, said handle is movable in a first direction to move said tire with respect to said wheel rim; said second end of said first handle segment and said third ends of said second handle segment being receivable within a cavity formed by an upper flange portion of said wheel rim.

11. The tire tool of claim 10, further comprising a second tool head connected to a second end of said handle, said second tool head having a tire engaging surface and a wheel rim engaging surface, wherein said wheel rim engaging surface of said second tool head comprises a roller member for engaging said wheel rim, said roller member having a pin axis oriented substantially perpendicular to said longitudinal of said tire tool.

12. The tire tool of claim 11, wherein said roller member comprises a rubber or polymer material.

13. The tire tool of claim 9, wherein said wheel rim engaging surface of said tool head comprises a lip for engaging the upper flange portion of said wheel rim.

14. The tire tool of claim 13, wherein said lip has a radius sized to engage the upper flange portion to minimize movement between the wheel rim engaging surface and the wheel rim in a direction substantially parallel to said longitudinal axis of said tire tool.

15. The tire tool of claim 9, wherein the handle has a second end, and said handle comprises a lateral arc that diverges from the longitudinal axis adjacent to one of the first and second ends.

16. The tire tool of claim 15, wherein the lateral arc positions the first and second ends substantially on the longitudinal axis.

\* \* \* \* \*